United States Patent [19]

Nakamatsu et al.

[11] Patent Number: 4,711,641
[45] Date of Patent: Dec. 8, 1987

[54] REACTIVE DYE COMPOSITION: MIXTURE OF REACTIVE COPPER PHTHALOCYANINE DYES: DICHLORO-TRIAZINYL DYE AND VINYL SULPHONYL TYPE DYE

[75] Inventors: Toshio Nakamatsu, Ibaraki; Tetsuya Miyamoto, Takatsuki; Kunihiko Imada, Sakai, all of Japan

[73] Assignee: Sumitomo Chemical Company, Limited, Osaka, Japan

[21] Appl. No.: 839,030

[22] Filed: Mar. 12, 1986

[30] Foreign Application Priority Data

Mar. 29, 1985 [JP] Japan ................................. 60-67161

[51] Int. Cl.$^4$ ...................... C09B 62/10; C09B 67/22; D06P 1/38
[52] U.S. Cl. .......................................... 8/524; 8/527; 8/549; 8/638; 8/661; 8/918
[58] Field of Search ................... 8/524, 527, 549, 661, 8/638

[56] References Cited

U.S. PATENT DOCUMENTS

| | | | |
|---|---|---|---|
| 4,078,885 | 3/1978 | Opitz et al. | 8/527 |
| 4,338,093 | 7/1982 | Hilderbrand et al. | 8/549 |
| 4,540,418 | 9/1985 | Otake et al. | 8/524 |
| 4,548,612 | 10/1985 | Kayame et al. | 8/524 |
| 4,602,915 | 7/1986 | Wolff et al. | 8/527 |

Primary Examiner—A. Lionel Clingman
Attorney, Agent, or Firm—Stevens, Davis, Miller & Mosher

[57] ABSTRACT

A reactive blue dye composition, which comprises a phthalocyanine dye represented by a free acid of the following formula (I),

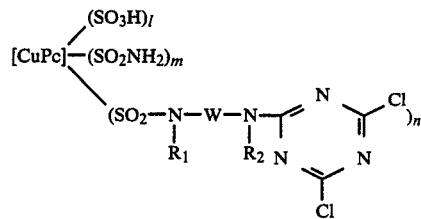

wherein CuPc is a copper phthalocyanine nucleus, W is a $C_2$–$C_4$ alkylene group or a 1,3- or 1,4-phenylene group having one or two sulfo groups, $R_1$ and $R_2$ are independently a hydrogen atom or a lower alkyl group, l is a number of 1 to 3, m is a number of 0 to 2, and n is a number of 1 to 3, provided that the total number of l, m and n is 4 or less, and a phthalocyanine dye represented by a free acid of the following formula (II),

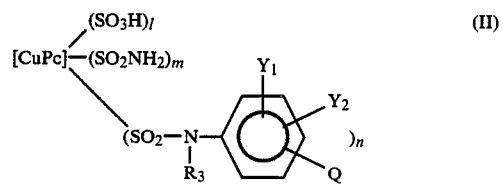

wherein CuPc, l, m and n are as defined above, $Y_1$ and $Y_2$ are independently a hydrogen atom or a methyl, methoxy or sulfo group, $R_3$ is a hydrogen atom or a lower alkyl group, and Q is —$SO_2CH=CH_2$ or —$SO_2CH_2CH_2Z$ in which Z is a splittable group by the action of an alkali, the mixing weight ratio of the dyes (I) to (II) in terms of a copper content being from 80 through 20 to from 20 through 80, which is useful for dyeing or printing fiber materials also in a blend with other color dyes such as yellow and red dyes to give dyed or printed products of a brilliant color excellent in fastness properties with high reproducibility.

9 Claims, No Drawings

REACTIVE DYE COMPOSITION: MIXTURE OF REACTIVE COPPER PHTHALOCYANINE DYES: DICHLORO-TRIAZINYL DYE AND VINYL SULPHONYL TYPE DYE

The present invention relates to a reactive dye composition. More specifically, the present invention relates to a blue reactive dye composition having excellent dye performances as well as superior compatibility with the other color reactive dyes, which comprises different kinds of copper phthalocyanine reactive dyes.

As well known, reactive dyes have been widely used for dyeing fiber materials, particularly cellulose fiber materials, and phthalocyanine reactive dyes are favorably useful therefor, because of their characteristic features of giving a dyed product of a brilliant blue color.

In order to be put into commercial use, however, blue reactive dyes are required to be excellent in various dye performances such as dyeability including fixability to fiber materials, various fastness properties and the like, and moreover, when used in the form of a blend with the other color dyes such as yellow dyes in order to obtain medium colors such as green, they are also required to give dyed products of a brilliant medium color excellent in levellness with high reproducibility. Thus, it has been desired to develope a phthalocyanine blue reactive dye meeting with such needs.

The present inventors have extensively undertaken studies to find a phthalocyanine reactive dye having excellent dye performances, particularly excellent exhaustion dyeing property, and giving dyed products of a brilliant color excellent in levellness, even when used in the form of a blend with the other color dyes, and as a result found a fact that the above object can be accomplished by providing a reactive dye composition comprising different kinds of specific copper phthalocyanine reactive dyes.

The present invention provides a reactive dye composition, which comprises a phthalocyanine dye represented by a free acid of the following formula (I),

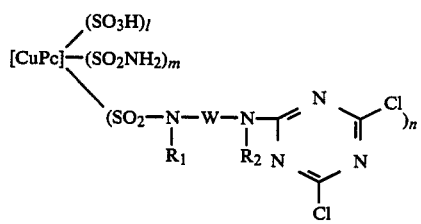

wherein CuPc is a copper phthalocyanine nucleus, W is a $C_2$–$C_4$ alkylene group or a 1,3- or 1,4-phenylene group having one or two sulfo groups, $R_1$ and $R_2$ are independently a hydrogen atom or a lower alkyl group, $l$ is a number of 1 to 3, $m$ is a number of 0 to 2, and $n$ is a number of 1 to 3, provided that the total number of $l$, $m$ and $n$ is 4 or less, and a phthalocyanine dye represented by a free acid of the following formula (II),

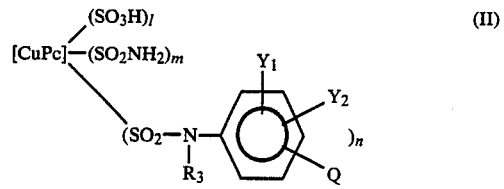

wherein CuPc, $l$, $m$ and $n$ are as defined above, $Y_1$ and $Y_2$ are independently a hydrogen atom or a methyl, methoxy or sulfo group, $R_3$ is a hydrogen atom or a lower alkyl group, and Q is $-SO_2CH=CH_2$ or $-SO_2CH_2CH_2Z$ in which Z is a splittable group by the action of an alkali, the mixing weight ratio of the dyes (I) to (II) in terms of a copper content being from 80 through 20 to from 20 through 80.

The dichlorotriazinyl group-carrying phthalocyanine dyes of the formula (I) have a high fixability at a low temperature and a chlorine fastness superior for phthalocyanine blue dyes. However, the phthalocyanine dyes (I) have drawbacks in an exhaustion dyeing property such that they are remarkably high in the substantivity and the dyeing velocity, so that a compatibility with the other color dyes such as yellow dyes in a blend dyeing to obtain medium colors such as green becomes inferior, thereby deteriorating a level dyeing property.

The vinylsulfone type group-carrying phthalocyanine dyes of the formula (II) are inferior in fastness properties such as chlorine fastness and wet fastness, and moreover they have drawbacks also in an exhaustion dyeing property such that they are inferior in a fixability at a low temperature and a dyeing temperature dependency (i.e. the color depth varies largely depending on a dyeing temperature), causing a low reproducibility, and moreover they are remarkably low in the dyeing velocity so that a compatibility with the other color dyes becomes inferior to deteriorate a level dyeing property.

Notwithstanding the above facts, the blue reactive dye composition of the present invention comprising such different kinds of the phthalocyanine dyes (I) and (II) has improved exhaustion dyeing properties, particularly fixability at a low temperature and dyeing temperature dependency as well as improved compatibility with the other color dyes, and moreover can give dyed products superior in various fastness properties and levellness with high reproducibility.

The reactive dye composition of the present invention may be in a solid or aqueous liquid form.

Each phthalocyanine dye of the formula (I) or (II) can be produced in a conventioned manner, for example, in the following manner.

A mixture of a copper phthalocyanine sulfochloride represented by a free acid of the following formula (III),

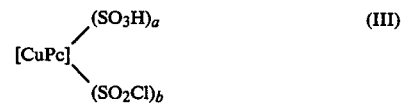

wherein CuPc is as defined above, and a and b are independently a number of 1 to 3, provided that the total number of a and b is 4 or less, and a diamine compound represented by the following formula (IV) or (V),

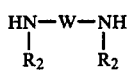  (IV)

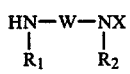  (V)

wherein W, $R_1$ and $R_2$ are as defined above, and X is an acyl group, can be subjected to reaction in an aqueous medium in the presence of an acid binding agent, while keeping the pH within a range of from 6 to 10 and the temperature within a range of from 0° to 100° C., preferably from 0° to 50° C., followed by hydrolysis with an acid or an alkali, when the diamine compound of the formula (V) is used. Successively, the resulting compound represented by a free acid of the following formula (VI),

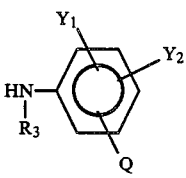  (VI)

wherein CuPc, W, $R_1$, $R_2$, l, m and n are as defined above, can be subjected to reaction with cyanuric chloride in the presence of an acid binding agent, while keeping the pH within a range of 4 to 10 and the temperature within a range of 0° to 100° C., preferably 0° to 30° C., thus obtaining the phthalocyanine dye of the formula (I).

The copper phthalocyanine sulfochloride of the formula (III) can be subjected to reaction with an amine compound represented by the following formula (VII), (VII)

wherein $R_3$, $Y_1$, $Y_2$ and Q are as defined above, in an aqueous medium in the presence of an acid binding agent preferably together with a reaction promoter such as pyridine, while keeping the pH within a range of 3 to 8 and the temperature within a range of 0° to 100° C., preferably 0° to 40° C., thus obtaining the other phthalocyanine dye of the formula (II).

Among the dichlorotriazinyl group-carrying phthalocyanine dyes (I), preferred are those having a $C_2$–$C_4$ alkylene group, particularly ethylene group as W, and a hydrogen atom or a methyl group as $R_1$ and $R_2$. The phthalocyanine dye (I) found to be especially usable in the composition of the present invention are exemplified as follows in a free acid form:

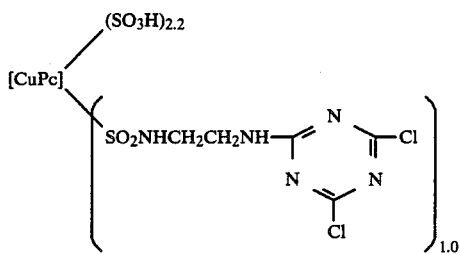

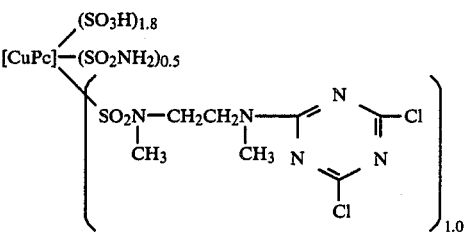

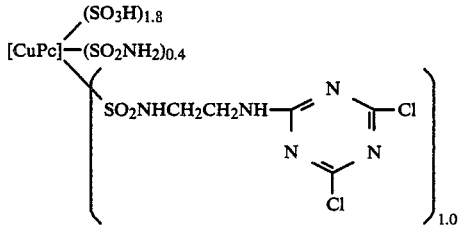

Among the vinylsulfone type group-carrying phthalocyanine dyes (II), preferred are those having a hydrogen atom or a methyl or ethyl group as $R_3$, and a hydrogen atom or a methyl or methoxy group as $Y_1$ and $Y_2$. The phthalocyanine dyes (II) found to be especially useful in the composition of the present invention are exemplified as follows in a free acid form:

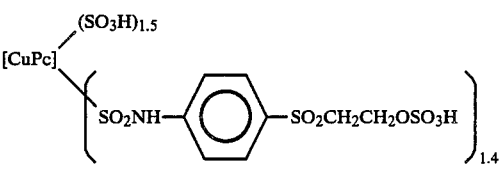

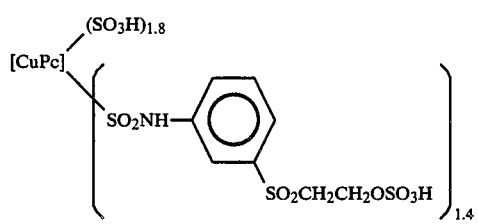

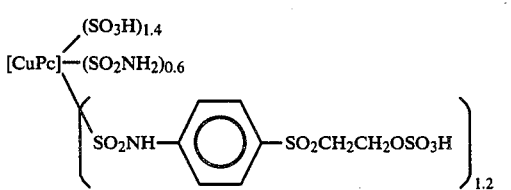

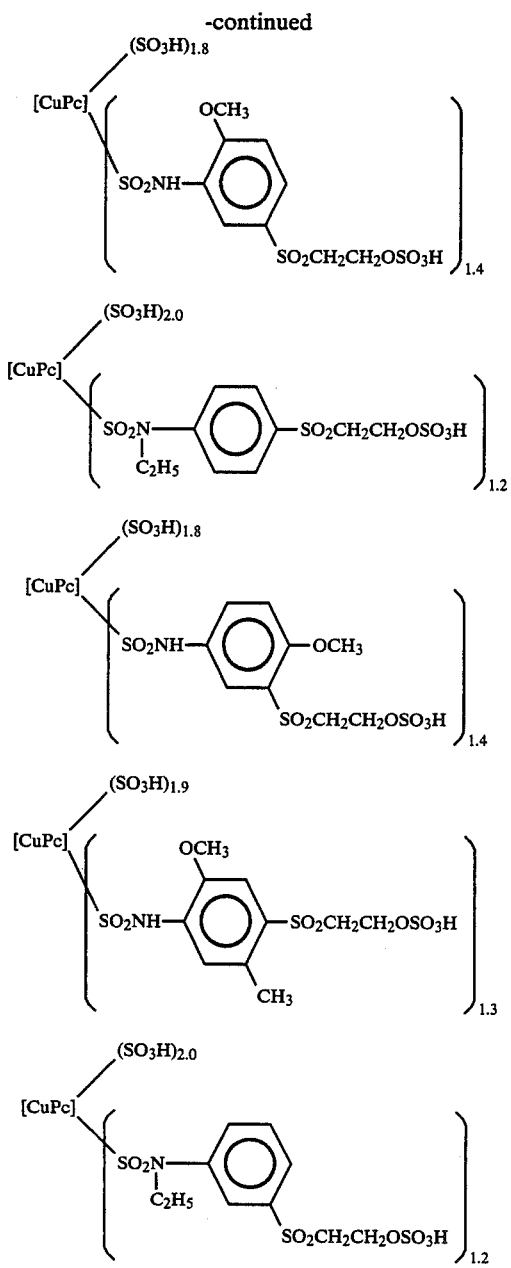

In the preparation of the dye composition in accordance with the present invention, both the aqueous reaction mixtures containing the phthalocyanine dyes of the formulae (I) and (II), respectively, which are obtainable in the aforesaid manners for the production of the dyes (I) and (II), may be mixed as such to obtain the desired dye composition in an aqueous liquid form. If desired, the liquid dye composition can be adjusted to a desired pH value by controlling the pH before or after mixing the reaction mixtures.

Alternatively, both the reaction mixtures may be dried individually in a conventional manner such as spray drying, followed by mixing both to obtain the desired dye composition in a solid form, or may be dried in a mixture thereof to obtain the desired solid dye composition. If desired, the solid dye composition may be adjusted to a desired pH value by controlling the pH before or after drying the reaction mixtures.

A pH value of the present dye composition ranges preferably from 4 to 9, more preferably from 6 to 8. In the present invention, the pH value of the solid dye composition is the one measured in an aqueous solution prepared by dissolving the solid dye composition (30 g) in distilled water (1000 ml).

The mixing weight ratio of the phthalocyanine dye of the formula (I) to the phthalocyanine dye of the formula (II) ranges from 80 through 20 to from 20 through 80 [(I)/(II)=80~20/20~80], preferably from 40 through 70 to from 60 through 30 [(I)/(II)=40~70/60~30], in terms of a copper content. The copper content is the one calculated by decomposing the dye with sulfuric acid or/and nitric acid, and then titrating the decomposition product with ethylenediamine tetracetate (EDTA).

The dye composition may further contain conventional auxiliary agents including, for example, dispersants, diluents such as anhydrous sodium sulfate, hydrotropic agents and the like.

The dye composition in accordance with the present invention is stable chemically and physically, irrespective of the aqueous liquid and solid forms, and useful for dyeing or printing fiber materials such as cellulose fiber materials including natural and regenerated cellulose fibers (e.g. cotton, hemp, viscose rayon, viscose staple fiber etc.) in a conventional manner. In the dyeing of fiber materials, for example, an exhaustion dyeing can be carried out at a relatively low temperature (for example, 50° to 80° C.) using a dye bath containing an acid binding agent such as sodium carbonate, trisodium phosphate, sodium hydroxide and the like, and an inorganic salt such as sodium sulfate, sodium chloride and the like. A conventional printing can be also applied to obtain favorable results. For example, the printing can be carried out by applying a printing paste containing an acid binding agent to cloth, drying the cloth and then treating it at a relatively high temperature (for example, 100° to 200° C.). The printing paste may further contain a hydrotropic agent such as urea, a reduction inhibitor such as sodium metanitrobenzenesulfonate, and the like.

The present invention is illustrated in more detail with reference to the following Examples, which are only illustrative and not intended to limit the scope of the present invention. In Examples, parts and % are by weight, unless otherwise specified.

EXAMPLE 1

A powder (60 parts) containing a dye of the following formula (1),

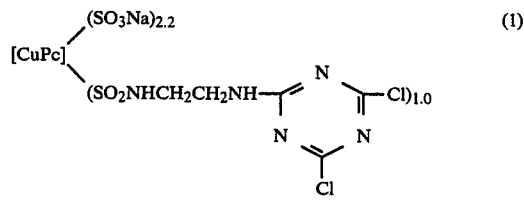

the copper content being 2.5%, was blended with a powder (40 parts) containing a dye of the following formula (2),

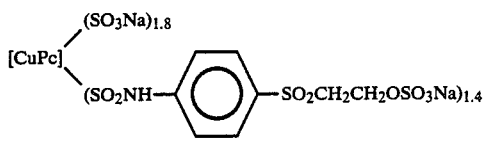

(2)

the copper content being 2.5%, to obtain a blue dye composition (100 parts). The composition was found to have a pH value of 7.0.

The composition (0.4 part) was dissolved in water (150 parts), and the solution was mixed with a 20% aqueous sodium sulfate solution (50 parts by volume). To this solution was dipped cotton (10 parts), and the bath was heated to 60° C. and 30 minutes thereafter, a 20% aqueous sodium carbonate solution (20 parts by volume) was added thereto. Dyeing was continued for 1 hour at that temperature. Thereafter, the cotton was rinsed with water, soaped and then dried to obtain a dyed product of a brilliant greenish blue color. The dyed product was found to be excellent in fastness properties including fastness to light, washing and chlorinated water, as hereinafter demonstrated.

EXAMPLE 2

The same dye (1)-containing powder as in Example 1 (70 parts) was blended with a powder (30 parts) containing a dye of the following formula (3),

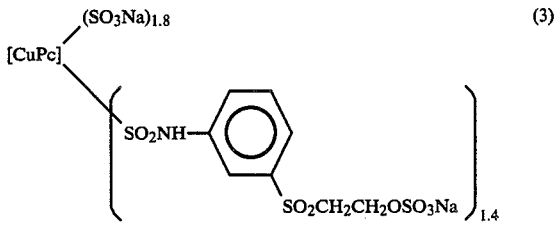

(3)

the copper content being 2.5%, to obtain a blue dye composition (100 parts). The dye composition was found to have a pH value of 6.5.

Using the dye composition (0.4 part), dyeing was carried out in the same manner as in Example 1 to obtain a dyed product of a brilliant greenish blue color excellent in fastness to light, washing and chlorinated water, as hereinafter demonstrated.

EXAMPLE 3

A powder (65 parts) containing a dye of the following formula (4),

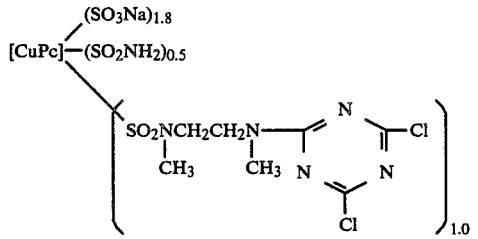

(4)

the copper content being 2.5%, was blended with a powder (35 parts) containing a dye of the following formula (5),

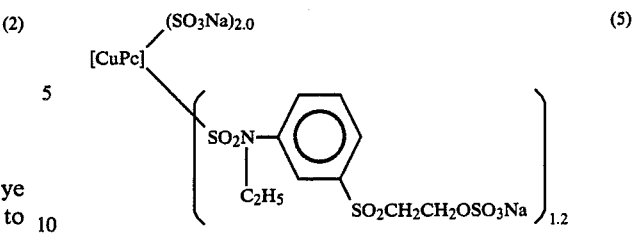

(5)

the copper content being 2.5%, to obtain a blue dye composition (100 parts). The dye composition was found to have a pH value of 7.0.

Using the dye composition (0.4 part), dyeing was carried out in the same manner as in Example 1, to obtain a dyed product of a brilliant greenish blue color excellent in fastness to light, washing and chlorinated water, as hereinafter demonstrated.

EXAMPLE 4

An aqueous solution (65 parts) containing a dye of the following formula (6),

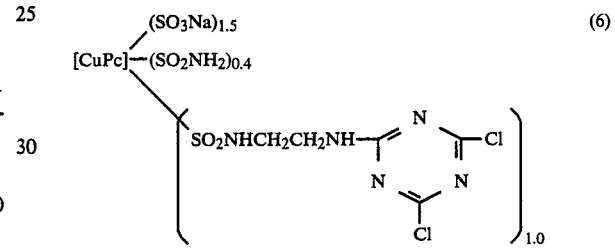

(6)

the pH value and the copper content being 7.0 and 0.25%, respectively, was blended with an aqueous solution (35 parts) containing a dye of the following formula (7),

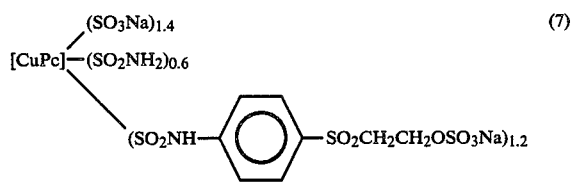

(7)

the pH value and the copper content being 7.0 and 0.25%, respectively, to obtain an aqueous liquid blue dye composition (100 parts).

Using the liquid dye composition (4.0 parts), dyeing was carried out in the same manner as in Example 1 to obtain a dyed product of a brilliant greenish blue color excellent in fastness to light, washing and chlorinated water, as hereinafter demonstrated.

The dye compositions obtained in Examples 1 to 4 were examined for their dye performances including fixability at a low temperature, dyeing temperature dependency, dyeing velocity, compatibility and fastness properties.

The examination were carried out as follows.

1. Fixability at low temperature

The dye composition (0.4 part) was dissolved in water (150 parts), and a 20% aqueous sodium sulfate solution (50 parts by volume) was added thereto to prepare a dye bath. Cotton (10 parts) was dipped therein, and the bath was heated to 50° C. 30 Minutes thereafter, a 20% sodium carbonate solution (20 parts by volume) was added thereto, and dyeing was continued for 1 hour at that temperature. Thereafter, the cotton was rinsed with water, soaped and dried to obtain a dyed product.

In order to find an optimum dyeing temperature, at which the highest color depth can be obtained, the above dyeing was repeated at 60° C., 70° C. and 80° C., respectively.

2. Dyeing temperature dependency

The dyed products obtained at dyeing temperatures of 50° C., 60° C. and 70° C. in the above item 1 were examined for their color depths, and evaluated as follows;

O: Through the whole dyeing process, there were observed difference in the color depth but little in the color shade.

Δ: Through the whole dyeing process, there were observed difference in color depth and some in the color shade.

X: Through the whole dyeing process, there were observed difference in color depth and remarkable in the color shade.

5. Light fastness: JIS L-0842
6. Washing fastness: JIS L-0844, cloth used for stainning being cotton cloth and wool cloth
7. Fastness to chlorinated water: ISO 105-E-03

The results were as shown in Table 1.

TABLE 1

| Dye composition | Fixability (Optimum dyeing temperature °C.) | Temperature dependency | Time of half dyeing (min.) | Compatibility | Light fastness (grade) | Washing Cotton (grade) | Washing Wool (grade) | Fastness to chlorinated water (grade) |
|---|---|---|---|---|---|---|---|---|
| Example 1 | 60 | O | 3.8 | O | 3-4 | 3-4 | 5 | 3 |
| Example 2 | 60 | O | 3.7 | O | 3-4 | 3-4 | 5 | 3 |
| Example 3 | 60 | O | 4.0 | O | 3-4 | 3-4 | 5 | 3 |
| Example 4 | 60 | O | 3.5 | O | 3-4 | 3-4 | 5 | 3 |
| C.I. Reactive Blue 140 | 50 | O | 0.9 | X | 3 | 3-4 | 5 | 3 |
| C.I. Reactive Blue 21 | 70 | X | 9.0 | X | 3-4 | 2-3 | 3 | 1-2 |

O: A difference between the highest color depth and the lowest color depth is 10% or less.
Δ: Said difference is higher than 10% but not higher than 20%.
X: Said difference is higher than 20%.

3. Dyeing velocity

Dyeing was carried out in a manner similar to that of item 1, provided that the dyeing was continued at the optimum dyeing temperature, and discontinued at the time when the color depth reached a half to the highest color depth, and the lapse of time from the addition of sodium carbonate to the discontinuation of dyeing was measured to find a time of half dyeing.

A time of half dyeing favorable from practical viewpoint is from 2.5 to 4.5 minutes.

4. Compatibility

A mixture of C.I. Reactive Yellow 145 (0.1 part), which is known to have a favorable time of half dyeing and the dye composition (0.2 part) was dissolved in water (150 parts), and a 20% aqueous sodium sulfate solution (50 parts by volume) was added to prepare a dye bath. Cotton (10 parts) was dipped therein and the bath was heated to 60° C. 30 Minutes thereafter, a 20% aqueous sodium carbonate solution (20 parts by volume) was added thereto, and the dyeing was continued for 1 hour at that temperature. Thereafter, the cotton was rinsed with water, soaped and dried to obtain a dyed product.

The above dyeing was repeated, but discontinued at the time when 5, 10, 30 and 60 minutes elapsed after the addition of sodium carbonate. Thus, change in the color depth and shade was examined according to the lapse of dyeing time, and evaluated as follows;

EXAMPLES 5 TO 9 AND COMPARATIVE EXAMPLES 1 TO 3

Example 1 was repeated to obtain several dye compositions different from each other in their pH values.

Using each dye composition, dyeing was carried out in the same manner as in Example 1.

On the other hand, in order to examine a heat resistance of the dye composition, the remaining dye composition was allowed to stand for a weak at 60° C., and thereafter subjected to dyeing in the same manner as in Example 1. The heat resistance was evaluated in terms of the difference in color depth, i.e. (the color depth obtained using the dye composition after the heat treatment/the color depth obtained using the dye composition before the heat treatment)×100(%). The results were as shown below.

| | pH value | Heat resistance (%) |
|---|---|---|
| Example No. | | |
| 1 | 7.0 | 98 |
| 5 | 4.0 | 90 |
| 6 | 5.0 | 94 |
| 7 | 6.0 | 98 |
| 8 | 8.0 | 98 |
| 9 | 9.0 | 94 |
| Comparative Example | | |
| 1 | 2.0 | 40 |
| 2 | 3.0 | 65 |
| 3 | 10.0 | 70 |

The above results demonstrate that dye compositions having a pH value within a range of from 4 to 9 are superior in heat resistance to those having a pH value beyond said range.

EXAMPLE 10

The same dye (1)-containing powder as in Example 1 (60 parts) is blended with a powder (40 parts) containing a dye of the following formula (8), (9), (10) or (11) the copper content being 2.5%, respectively, to obtain each blue dye composition.

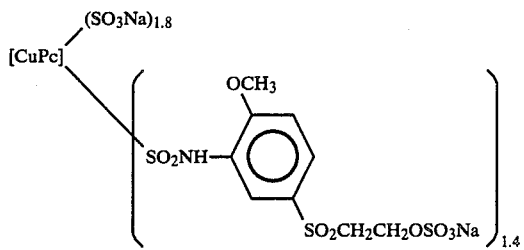

Using each dye composition (0.4 part), dyeing can be carried out in the same manner as in Example 1 to obtain each dyed product of a brilliant greenish blue color excellent in fastness to light, washing and chlorinated water.

What is claimed is:

1. A reactive dye composition, which comprises a phthalocyanine dye represented by a free acid of the following formula (I),

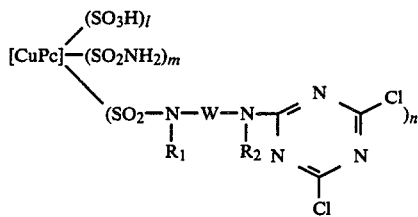

wherein CuPc is a copper phthalocyanine nucleus, W is a $C_2$-$C_4$ alkylene group or a 1,3- or 1,4-phenylene group having one or two sulfo groups, $R_1$ and $R_2$ are independently a hydrogen atom or a lower alkyl group, l is a number of 1 to 3, m is a number of 0 to 2, and n is a number of 1 to 3, provided that the total number of l, m and n is 4 or less, and a phthalocyanine dye represented by a free acid of the following formula (II),

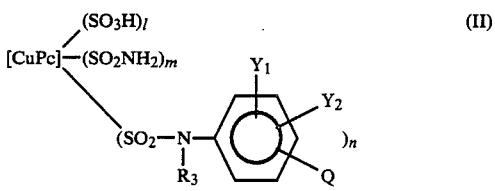

wherein CuPc, l, m and n are as defined above, $Y_1$ and $Y_2$ are independently a hydrogen atom or a methyl, methoxy or sulfo group, $R_3$ is a hydrogen atom or a lower alkyl group, and Q is $-SO_2CH=CH_2$ or $-SO_2CH_2CH_2Z$ in which Z is a splittable group by the action of an alkali, the mixing weight ratio of the dyes (I) to (II) in terms of a copper content being from 80 through 20 to from 20 through 80.

2. The dye composition according to claim 1, wherein the mixing weight ratio of the dye (I) to the dye (II) is from 40 through 70 to from 60 through 30.

3. The dye composition according to claim 1, wherein the dye composition is in a solid or aqueous liquid form.

4. The dye composition according to claim 1, wherein the dye composition has a pH value of from 4 through 9.

5. The dye composition according to claim 1, wherein the phthalocyanine dye of the formula (I) is a member selected from the phthalocyanine dyes represented by each free acid of the following formulae,

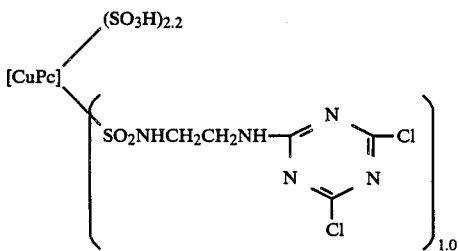

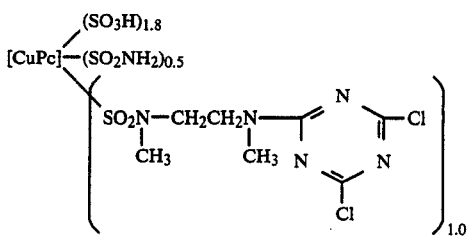

and

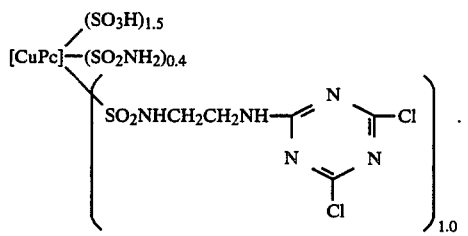

6. The dye composition according to claim 1, wherein the phthalocyanine dye of the formula (II) is a member selected from the phthalocyanine dyes represented by each free acid of the following formulae,

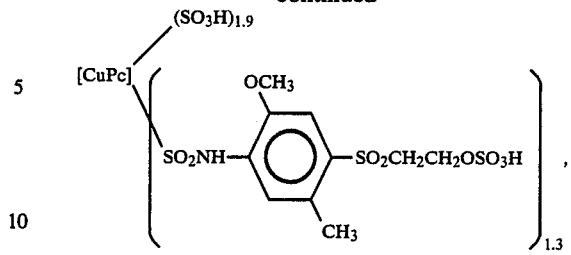

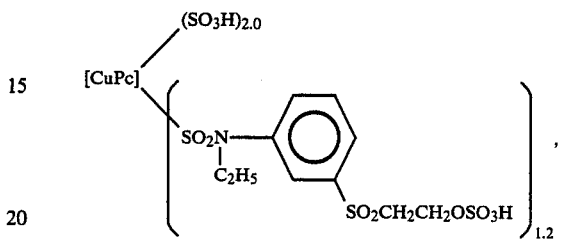

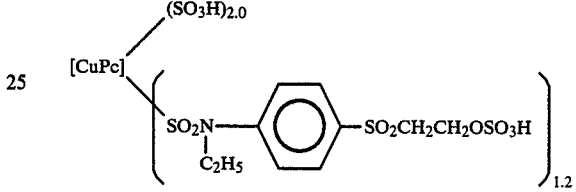

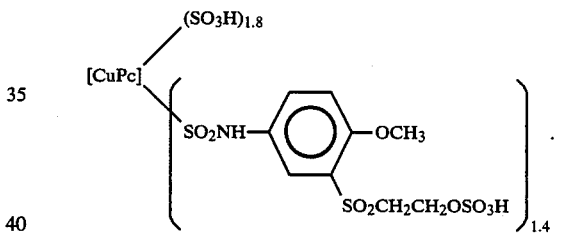

and

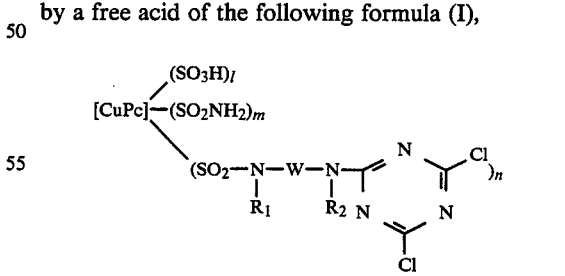

7. The dye composition according to claim 1, wherein the dye composition additionally comprises at least one conventional auxiliary agents.

8. A method for producing a dyed or printed fiber product of a brilliant color, which comprises dyeing or printing a fiber material with a blue reactive dye composition comprising a phthalocyanine dye represented by a free acid of the following formula (I), $$[CuPc] \begin{matrix} (SO_3H)_l \\ (SO_2NH_2)_m \\ (SO_2-N-W-N-\underset{\underset{N}{\parallel}}{C}\diagdown \underset{N}{N} \diagup \underset{\underset{Cl}{\parallel}}{C}-Cl)_n \\ \phantom{(SO_2-}R_1\phantom{-W-}R_2 \end{matrix}$$

wherein CuPc is a copper phthalocyanine nucleus, W is a $C_2$-$C_4$ alkylene group or a 1,3- or 1,4-phenylene group having one or two sulfo groups, $R_1$ and $R_2$ are independently a hydrogen atom or a lower alkyl group, l is a number of 1 to 3, m is a number of 0 to 2, and n is a number of 1 to 3, provided that the total number of l, m and n is 4 or less, and a phthalocyanine dye represented by a free acid of the following formula (II),

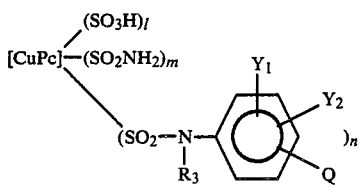

wherein CuPc, l, m and n are as defined above, $Y_1$ and $Y_2$ are independently a hydrogen atom or a methyl, methoxy or sulfo group, $R_3$ is a hydrogen atom or a lower alkyl group, and Q is $-SO_2CH=CH_2$ or $-SO_2CH_2CH_2Z$ in which Z is a splittable group by the action of an alkali, the mixing weight ratio of the dyes (I) to (II) in terms of a copper content being from 80 through 20 to from 20 through 80, optionally together with the other color dye(s).

9. A fiber product dyed or printed by the method of claim 8.

* * * * *